Jan. 8, 1963 W. L. SONES 3,072,840
REGULATING SYSTEM FOR ALTERNATORS
Filed July 27, 1961 2 Sheets-Sheet 1
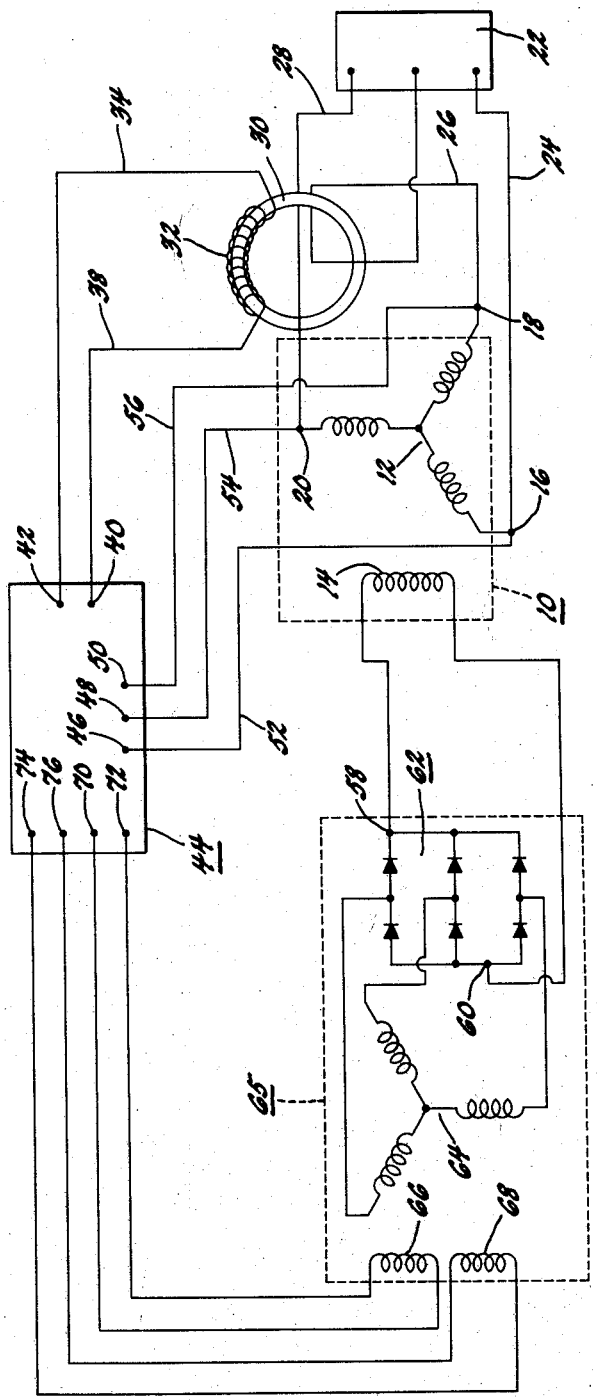
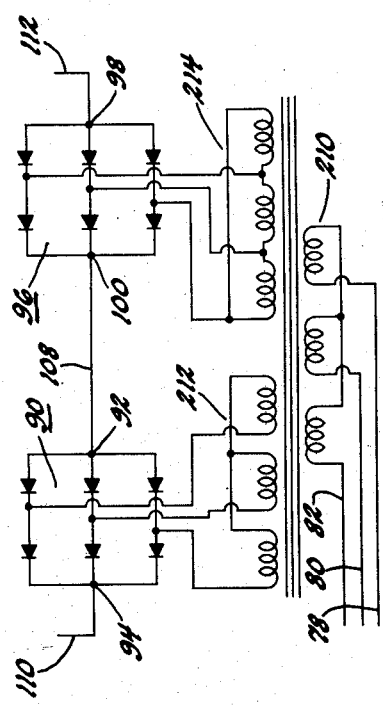
INVENTOR.
William L. Sones
BY C. R. Meland
HIS ATTORNEY Jan. 8, 1963   W. L. SONES   3,072,840
REGULATING SYSTEM FOR ALTERNATORS
Filed July 27, 1961   2 Sheets-Sheet 2

INVENTOR.
William L. Sones
BY C. R. Meland
HIS ATTORNEY

United States Patent Office
3,072,840
Patented Jan. 8, 1963

1

3,072,840
REGULATING SYSTEM FOR ALTERNATORS
William L. Sones, Dayton, Ohio, assignor to General Motors Corporation, Detroit, Mich., a corporation of Delaware
Filed July 27, 1961, Ser. No. 127,293
8 Claims. (Cl. 322—73)

This invention relates to regulating systems for alternating current generators and more particularly to regulating systems wherein a transistor voltage regulator controls the output of an alternator.

One of the objects of this invention is to provide a voltage regulator which exhibits close regulation and rapid response to transients.

In high performance voltage regulators it is often necessary to incorporate damping and anti-hunt circuits. These circuits hinder optimum response to transient loads thrown suddenly on and off the generator being regulated. It accordingly is another object of this invention to provide a high performance voltage regulator for generators that do not require anti-hunt devices.

Another object of this invention is to provide a voltage regulating system wherein a transistor regulator has a sensing circuit that is connected directly with a pair of bridge rectifiers without the use of filtering circuits. This object is accomplished by feeding the respective bridge rectifier networks from a respective three-phase winding wherein one of these three-phase windings is Y-connected and the other is delta connected. With this arrangement the ripple frequency at the output of the bridge rectifiers is not objectionable and may be applied directly to the regulator without the use of filtering networks.

Further objects and advantages of the present invention will be apparent from the following description, reference being had to the accompanying drawings wherein preferred embodiments of the present invention are clearly shown.

In the drawings:

FIGURE 1 is a schematic circuit illustration of a power system made in accordance with this invention.

FIGURE 3 is a schematic circuit illustration of a modified arrangement of a portion of FIGURE 2.

Figure 2:
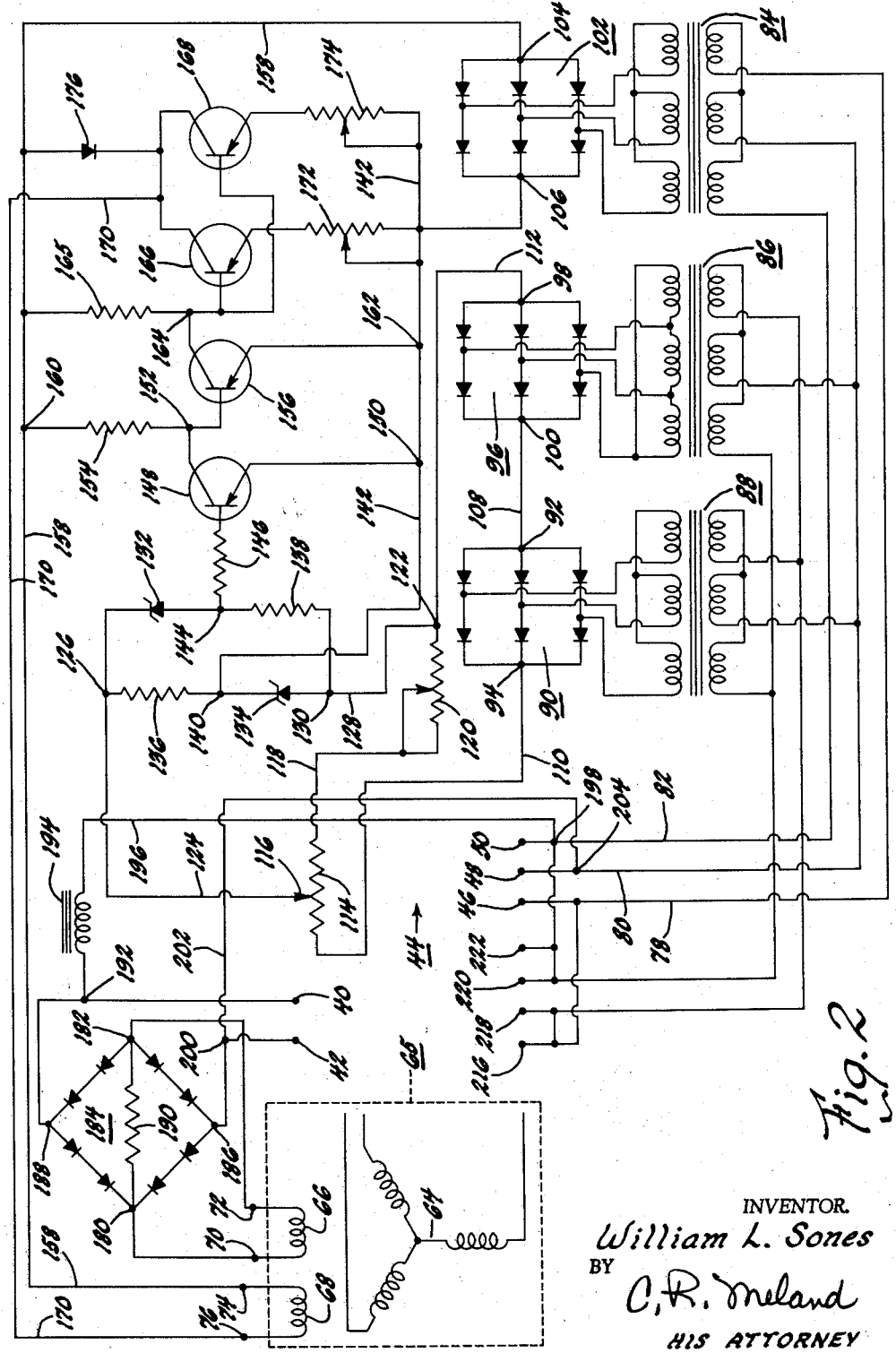
FIGURE 2 is a schematic circuit diagram showing the voltage regulating system employed in FIGURE 1.

Referring now to the drawings and more particularly to FIGURE 1, the reference numeral 10 designates an alternating current generator having a three-phase Y-connected output winding 12 and a field winding 14. The phase windings of the three-phase output winding 12 are connected respectively with junctions 16, 18 and 20. The junctions 16, 18 and 20 feed a load designated by reference numeral 22 through the lead wires 24, 26 and 28. It is seen from FIGURE 1 that the lead wires 26 and 28 which carry load current pass through an iron core 30 which carries a coil winding 32. The lead wire 28 passes in one direction through the core 30 whereas the lead wire 26 passes in an opposite direction through the core 30. The core 30 and the coil winding 32 form part of a current transformer and the coil winding 32 supplies current to the lead wires 34 and 38 connected with two terminals 40 and 42 of a regulator generally designated by reference numeral 44.

The junctions 16, 18 and 20 which are connected with the three-phase output winding 12 are connected respectively with terminals 46, 48 and 50 of the regulator 44 via the lead wires 52, 54 and 56. The terminals 46, 48 and 50 as will become more readily apparent hereinafter supply three-phase A.C. power to the regulator 44 which is shown in detail in FIGURE 2.

The field winding 14 of the main power generator 10 is fed from the output terminals 58 and 60 of a three-phase bridge rectifier network generally designated by reference numeral 62. The input terminals of the bridge rectifier 62 are fed from a three-phase Y-connected output winding 64 of an alternating current generator 65 which has field windings 66 and 68. The field winding 66 is connected with terminals 70 and 72 of the regulator 44 whereas the field winding 68 is connected with terminals 74 and 76 of the regulator 44. With the arrangement as just described it can be seen that the output voltage of alternator 10 depends upon the amount of field current passing through field winding 14 and that this field current depends upon the output voltage coming from three-phase winding 64. The output voltage coming from output winding 64 is, of course, dependent upon the field current in field windings 66 and 68.

Referring now more particularly to FIGURES 1 and 2, it is seen that the terminals 46, 48 and 50 of the regulator 44 are connected, respectively, with lead wires 78, 80 and 82. The lead wires 78, 80 and 82 feed the three-phase Y-connected primary winding of a transformer 84. It is seen that the lead wires 78, 80 and 82 also feed the primary windings of three-phase transformers 86 and 88. It is pointed out that the primary winding of transformer 86 is Y-connected as is the primary winding of transformer 88. The secondary winding of transformer 88 is also Y-connected and is connected to the input terminals of a three-phase full wave bridge rectifier network 90 which has output terminals 92 and 94. The secondary winding of transformer 84 is Y-connected and is connected with the input terminals of three-phase full wave bridge rectifier network 102. The output terminals of the bridge rectifier network 102 are designated by reference numerals 104 and 106. The secondary winding of transformer 86 is delta connected and feeds the three-phase full wave bridge rectifier network 96 having D.C. output terminals 98 and 100.

The output terminals 92 and 100 of bridge rectifiers 90 and 96 are connected together by a lead wire 108. The output terminal 94 of bridge rectifier 90 is connected with lead wire 110 whereas the output terminal 98 of bridge rectifier 96 is connected with lead wire 112. The lead wire 110 is connected to one side of the potentiometer resistor 114 having a shiftable slider or tap 116. The opposite side of resistor 114 is connected with lead wire 118 and this lead wire is connected with another potentiometer resistor 120. The opposite side of resistor 120 is connected with junction 122 and this junction is tied to the lead wire 112.

The shiftable tap 116 is connected with lead wire 124 which is in turn connected with junction 126. The junction 122 is connected with lead wire 128 and this lead wire is connected with junction 130. The junctions 126 and 130 are connected by a bridge network that includes Zener diodes 132 and 134 and the resistors 136 and 138. The junction 140, connected between resistor 136 and Zener diode 134, is connected with lead wire 142. The junction 144 located between Zener diode 132 and resistor 138 is connected to one side of a resistor 146. The Zener diodes 132 and 134 will not permit current flow in a reverse direction through the diodes until a predetermined voltage is reached, whereupon they break down and operate as constant voltage devices. The operation of these diodes is well known to those skilled in the art.

The resistor 146 is connected with the base electrode of a PNP transistor 148. The emitter electrode of transistor 148 is connected with lead wire 142 at junction 150. The collector electrode of transistor 148 is connected with junction 152 and this junction is connected with resistor 154 and the base electrode of another PNP transistor 156.

One side of resistor 154 is connected with lead wire 158 at junction 160.

The emitter electrode of transistor 156 is connected with lead wire 142 at junction 162. The collector electrode of transistor 156 is connected with junction 164 and a resistor 166 connects the junction 164 with lead wire 158. It is seen that the junction 164 is connected with the base electrodes of parallel connected transistors 166 and 168. The collector electrodes of transistors 166 and 168 are tied together and are connected with lead wire 170. The emitter electrodes of transistors 166 and 168 are connected with lead wire 142 through potentiometer resistors 172 and 174. It is seen that the lead wire 142 is connected with the D.C. output terminal 106 of bridge rectifier 102, whereas the lead wire 158 is connected with the D.C. output terminal 104 of bridge rectifier 102. A diode 176 connects the collector electrodes of transistors 166 and 168 with the lead wire 158.

The field winding 68 that controls the output voltage of generator 65 is connected directly across lead wires 170 and 158 through junctions 76 and 74. It is thus seen that the field winding 68 will be energized from the output terminals of bridge rectifier 102 and that the current flow through this field winding will be controlled by the emitter-collector circuits of parallel connected transistors 166 and 168.

The field winding 66 is connected with the output terminals 180 and 182 of a bridge rectifier network 184 through terminals 70 and 72. The bridge rectifier 184 has A.C. input terminals 186 and 188. The terminals 180 and 182 are connected by a surge resistor 190 as is clearly apparent from FIGURE 2. The input terminal 188 is connected with a junction 192 and this junction is connected with terminal 40 which, as seen from FIGURE 1, is connected to one side of the output winding 32 of the current transformer. The junction 192 is connected with an inductive choke 194 and the opposite side of this inductive choke is connected with lead wire 196. It is seen that the lead wire 196 is connected with lead wire 82 at junction 198.

The input terminal 186 of bridge rectifier 184 is connected with a junction 200 and this junction is connected with terminal 42. It thus is seen that the junctions 186 and 188 are connected directly across the winding 32 of the current transformer via terminals 40 and 42. The junction 200 is connected with lead wire 202 and this lead wire is connected with lead wire 80 at junction 204. It can be seen that the voltage appearing between lead wires 80 and 82 is also impressed across the input terminals of bridge rectifier 184 as well as the output from winding 32 of the current transformer.

Referring now more particularly to FIGURE 3, a modified transformer arrangement is illustrated for energizing the bridge rectifier networks 90 and 96. In FIGURE 3 a single primary winding 210 is connected by lead wires with the A.C. input terminals 46, 48 and 50. The primary winding 210 is a Y-connected winding and the transformer has secondary windings 212 and 214 which, respectively, are connected with the bridge rectifier networks 90 and 96. It is pointed out that the secondary winding 212 is a Y-connected winding, whereas the secondary winding 214 is a delta connected winding. The arrangement of FIGURE 3 is thus the same as the arrangement of FIGURE 2 with the exception that only primary winding 210 is used. It is pointed out that a single primary winding could also be used to energize the three secondary windings of FIGURE 2 by consolidating these units into one transformer. Where the primary winding feeds three secondary windings, some performance may be sacrificed, but with the FIGURE 3 arrangement there is no sacrifice in performance.

In the operation of this system the voltage regulator 44 controls the energization of field windings 66 and 68 and the energization of the field winding 14 is controlled by the output voltage of bridge rectifier 62. The output voltage of the alternator 10 is thus a function of the current flowing through field windings 66 and 68.

The voltage that is sensed by the transistor voltage regulator is taken across terminals 94 and 98 of bridge rectifiers 90 and 96. The output voltage of these two bridge rectifiers is additive and is applied to junctions 126 and 130. It is noted that there are no filtering circuits connected between the output terminals of the bridge rectifiers 90 and 96 and the voltage sensing terminals 126 and 130 of the transistor voltage regulator. These filtering circuits are not required because of the reduction in ripple voltage that is achieved by the system of this invention. Thus, by providing secondaries for transformers 86 and 88 wherein one is Y-connected and the other is delta connected, there is provided output voltages respectively from bridge rectifiers 90 and 96 which have a direct current and ripple frequency which is six times the fundamental line frequency. Since the output voltages of bridge rectifiers 90 and 96 are additive, the voltage developed at the voltage sensing terminals of the voltage regulator has a ripple frequency of twelve times the fundamental line frequency. The amplitude of the ripple voltage is one-half of the amplitude of the ripple voltage of either bridge rectifier taken alone. With this low magnitude of ripple voltage it is possible to directly feed the voltage sensing network of the transistor voltage regulator without the use of filter circuits. This provides for high gain with no filtering time delays and, therefore, makes close regulation possible. It is possible, of course, to introduce some filtering if desired and due to the high ripple frequency and low amplitude of the ripple voltage, the time delays which are introduced by filtering networks are far enough removed from the generator time constants to meet the stability criteria with high performance.

The output terminals 140 and 144 of the bridge network that include the Zener diodes 132 and 134 are connected across the emitter and base electrodes of transistor 148. It is seen that as the voltage appearing between junctions 126 and 130 increases, the potential of junction 144 becomes more positive with respect to junction 140. This is assuming that the junction 94 of bridge rectifier 90 is a positive terminal and that the junction 98 of bridge rectifier 96 is a negative terminal. When junction 144 becomes more positive with respect to junction 140, the conduction of transistor 148 is reduced which in turn drives the junction 152 more positive. This will cause the conduction of transistor 156 to be reduced in its emitter-collector circuit with a result that the potential of junction 164 becomes more negative to thus reduce the conduction of transistors 166 and 168 in their emitter-collector circuits. It thus is seen that when the voltage applied across junctions 126 and 130 increases, the conduction of transistors 166 and 168 in their emitter-collector circuits is reduced. With the conduction of transistors 166 and 168 reduced, the field current through field winding 68 is reduced, since the emitter-collector circuits of transistors 166 and 168 control field current coming from the junctions 104 and 106 of bridge rectifier 102.

As the voltage appearing across junctions 126 and 130 decreases, the conduction of transistors 166 and 168 is increased to therefore increase the field current through field winding 68 and increase the output voltage coming from output winding 64. It thus is seen that the output voltage from output winding 12 of alternator 10 is sensed and is applied to the transistor voltage regulator which, in turn, controls field current through field winding 68 and, therefore, the output voltage of output winding 64 which in turn energizes field winding 14.

The current flow through field winding 66 adds to the flux generated by the field winding 68 and the current through field winding 66 is a function of the output voltage appearing across D.C. terminals 180 and 182. As noted, the bridge rectifier 184 is fed from lead wires 80 and 82 and is also fed from the current transformer winding 32. The field winding 66 is thus a compensating winding whereas the field winding 68 can be termed a regulating field winding. It is noted that the regulator of this system is useful when only one field winding 68 is provided and is also useful in instances where the flux generated by field winding 66 would oppose the flux generated by field winding 68.

The terminals 216, 218, 220 and 222 are provided and may be connected with any conventional droop circuit.

It can be seen from the foregoing that a high performance voltage regulating system has been provided wherein a sense voltage is applied directly to the transistor regulator without the use of filtering circuits. In addition, this voleage regulator has high performance without the use of anti-hunt devices. The particular voltage regulating circuit that has been described thus eliminates parts that were previously thought to be required to obtain high performance voltage regulation.

While the embodiments of the present invention as herein disclosed constitute preferred forms, it is to be understood that other forms might be adopted.

What is claimed is as follows:

1. A voltage regulating system comprising, a generator having a field winding, transistor regulating means connected with said field winding for controlling the energization of said field winding, said transistor regulating means having a sensing circuit connectable with a sense voltage, transformer means having at least one three-phase primary winding adapted to be connected with a source of three-phase A.C. voltage and including first and second secondary windings, said first secondary winding being Y-connected and said second secondary winding being delta connected, first and second three-phase full wave bridge rectifier networks, means connecting the A.C. input terminals of said first bridge rectifier network with said first secondary winding, means connecting the A.C. input terminals of said second bridge rectifier network with said second secondary winding, and means connecting the D.C. output terminals of said bridge rectifier networks together and with said sensing circuit of said transistor regulating means.

2. In combination, a transistor voltage regulating means including at least one transistor having a pair of sensing terminals, three-phase transformer means including at least one primary winding and a pair of secondary windings, one of said secondary windings being Y-connected and the other of said secondary windings being delta connected, first and second bridge rectifiers connected respectively with said secondary windings, and means connecting the D.C. terminals of said bridge rectifiers together and with the sensing terminals of said transistor voltage regulating means.

3. An electric circuit for applying a D.C. sense voltage to a voltage regulator comprising, three-phase transformer means including at least one three-phase primary winding adapted to be connected with a source of three-phase voltage, said transformer means including first and second secondary windings, said first secondary winding being Y-connected and said second secondary winding being delta connected, first and second three-phase full wave bridge rectifier networks connected respectively with said secondary windings, and means connecting the D.C. terminals of said bridge rectifier networks together whereby the output voltage of said bridge rectifier networks is additive.

4. In combination, an electrical load, a source of three-phase voltage, three-phase transformer means having at least one primary winding and including first, second and third secondary windings, said first secondary winding being Y-connected and said second secondary winding being delta connected, first and second three-phase full wave bridge rectifier networks connected respectively with said first and second secondary windings, transistor regulating means including at least one transistor having emitter, base and collector electrodes, a third bridge rectifier network connected with the third secondary winding, a circuit for energizing said load from the D.C. output terminals of said third bridge rectifier network including the emitter-collector circuit of said transistor, means connecting the D.C. output terminals of said first and second bridge rectifier networks together and with a pair of lead wires whereby a voltage is impressed across said lead wires that is the sum of the output voltages of said first and second bridge rectifier networks, and a sensing circuit for said transistor voltage regulator connected with said lead wires.

5. In combination, a first alternating current generator having an output winding and a field winding, an electrical load energized from said output winding, a second alternating current generator having a field winding and an output winding, rectifier means connected between the output winding of said second alternating current generator and the field winding of said first alternating current generator, transformer means including at least one three-phase primary winding connected with the output winding of said first alternating current generator, said transformer means including first, second and third three-phase secondary windings, said first three-phase secondary winding being Y-connected and said second three-phase secondary winding being delta connected, first and second three-phase full wave bridge rectifier networks connected respectively with said first and second secondary windings, a third three-phase full wave bridge rectifier network connected with said third secondary winding, transistor voltage regulating means connected with the D.C. output terminals of said third bridge rectifier network and with the field winding of said second alternating current generator for controlling the energization of said field winding from said third full wave bridge rectifier network, means connecting the D.C. output terminals of said first and second bridge rectifier networks together and with a pair of lead wires whereby a voltage is impressed across said lead wires which is the sum of the voltages appearing across the D.C. output terminals of said first and second bridge rectifier networks, and means connecting said lead wires with a sensing circuit of said transistor voltage regulating means.

6. An electrical system comprising, a generator having a field winding, transistor voltage regulating means including at least one transistor for controlling the energization of said field winding, said transistor regulator having a voltage sensing circuit including terminals connected with a pair of Zener diodes, three-phase transformer means including at least one three-phase primary winding and first and second three-phase secondary windings, said first secondary winding being Y-connected and said second secondary winding being delta connected, and bridge rectifier means connected with said first and second secondary windings and feeding the terminals of the voltage sensing network of said transistor voltage regulator.

7. A voltage regulator for controlling current flow through the field winding of a generator comprising, output terminals adapted to be connected with said field winding for controlling current flow therethrough, a transistor having emitter and collector electrodes connected with said output terminals, means connected with the base electrode of said transistor for controlling its conductivity in accordance with voltages impressed across a pair of voltage sensing terminals, three-phase transformer means including at least one three-phase primary winding and first and second three-phase secondary windings, said first secondary winding being Y-connected and said second secondary winding being delta connected, first and second three-phase full wave bridge rectifier networks connected respectively with said first and second secondary windings, and means connecting the D.C. output terminals of said first and second bridge rectifier networks together and with said voltage sensing terminals.

8. A voltage regulator for controlling the energization of a field winding of a generator or the like comprising, a pair of output terminals adapted to be connected with said field winding, a semi-conductor connected with said output terminals, means connected with said semi-conductor for controlling its conductivity in accordance with voltages applied across a pair of voltage sensing terminals, three-phase transformer means including at least one three-phase primary winding and first and second three-phase secondary windings, said first secondary winding being Y-connected and said second secondary winding being delta connected, a first three-phase full wave bridge rectifier network connected with said first secondary winding, a second three-phase full wave bridge rectifier network connected with said second secondary winding, and means connecting the D.C. output terminals of said first and second bridge rectifier networks together and with said voltage sensing terminals.

No references cited.